US009992835B2

(12) United States Patent
Matsui et al.

(10) Patent No.: US 9,992,835 B2
(45) Date of Patent: Jun. 5, 2018

(54) LIGHTING CIRCUIT

(71) Applicant: KOITO MANUFACTURING CO., LTD., Tokyo (JP)

(72) Inventors: Kotaro Matsui, Shizuoka (JP); Takao Sugiyama, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days. days.

(21) Appl. No.: 15/093,279

(22) Filed: Apr. 7, 2016

(65) Prior Publication Data
US 2016/0302267 A1    Oct. 13, 2016

(30) Foreign Application Priority Data

Apr. 7, 2015    (JP) .................................. 2015-078678

(51) Int. Cl.
*H05B 33/08* (2006.01)
*B60Q 1/38* (2006.01)

(52) U.S. Cl.
CPC ........... *H05B 33/0845* (2013.01); *B60Q 1/38* (2013.01); *B60Q 2400/30* (2013.01)

(58) Field of Classification Search
CPC .............. H05B 33/083; H05B 33/0815; H05B 33/0842; H05B 33/0854; H05B 33/0812; H05B 37/0272; B60Q 1/1413; B60Q 1/34
USPC .... 315/211, 307, 224, 294; 362/1, 460, 465, 362/543
See application file for complete search history.

(56) References Cited

U.S. PATENT DOCUMENTS

| | | | |
|---|---|---|---|
| 7,005,978 B2* | 2/2006 | Takeuchi | B60Q 1/38 315/224 |
| 7,446,488 B1* | 11/2008 | Cross | H05B 41/288 315/209 R |
| 8,040,071 B2 | 10/2011 | Lin et al. | |
| 8,415,901 B2* | 4/2013 | Recker | H05B 33/0803 315/172 |

(Continued)

FOREIGN PATENT DOCUMENTS

| | | |
|---|---|---|
| CN | 1497509 A | 5/2004 |
| CN | 103037571 A | 4/2013 |
| JP | 2013-060151 A | 4/2013 |

OTHER PUBLICATIONS

Office Action issued in Counterpart Chinese Patent Application No. 201610209949.1, dated Jun. 9, 2017 (12 pages).

*Primary Examiner* — Douglas W Owens
*Assistant Examiner* — Syed M Kaiser
(74) *Attorney, Agent, or Firm* — Osha Liang LLP (57) ABSTRACT

A lighting circuit is configured to supply a driving current to a first light source and a second light source. The light circuit includes a conversion unit which receives a first voltage for the first light source and a second voltage for the second light source via a common input terminal, performs voltage conversion on the first voltage or the second voltage and supplies the driving current, a control unit which controls a current value of the driving current output from the conversion unit, a first switch which selects whether to supply the driving current to the first light source by a first signal based on the first voltage, a signal generation unit which receives the first voltage and the second voltage and generates a second signal, and a second switch which selects whether to supply the driving current to the second light source by the second signal.

7 Claims, 7 Drawing Sheets

(56) References Cited

U.S. PATENT DOCUMENTS

| | | | |
|---|---|---|---|
| 8,773,028 B2* | 7/2014 | Kubota | H05B 37/02 315/201 |
| 2006/0061301 A1* | 3/2006 | Ito | H05B 33/0845 315/291 |
| 2010/0202153 A1* | 8/2010 | Schwab | B60Q 1/0041 362/520 |
| 2013/0088172 A1 | 4/2013 | Kikuchi et al. | |
| 2014/0184079 A1* | 7/2014 | Marchesin | H05B 33/0824 315/122 |
| 2015/0102723 A1* | 4/2015 | Krick | B60Q 3/00 315/77 |

* cited by examiner

LIGHTING CIRCUIT

CROSS-REFERENCE TO RELATED APPLICATIONS

The present application claims the benefit of priority of Japanese Patent Application No. 2015-078678, filed on Apr. 7, 2015, the content of which is incorporated herein by reference.

TECHNICAL FIELD

Aspects of the present invention relate to a lighting circuit, and particularly, to a light emission driving technology of two light sources configured to perform different functions.

BACKGROUND

JP-A-2013-60151 discloses a vehicle lamp unit having a high-beam lamp, a low beam lamp, a daytime running lamp (DRL), a turn signal lamp and a clearance lamp (CLL).

The DRL is turned on so as to enable a pedestrian or a driver of an opposite vehicle to recognize a traveling vehicle in the daytime. The CLL is mounted on a front face of a vehicle so as to indicate a width size of the vehicle and existence of the vehicle. The turn signal lamp is configured to blink so as to inform drivers of front and rear vehicles of turning and route change of a vehicle.

For example, in related-art turn signal lamp and DRL, in order to turn on a light source for the DRL (hereinafter, referred to as 'a DRL light source') and a light source for the turn signal lamp (hereinafter, referred to as 'a turn light source') at the same time, the DRL light source and the turn light source are arranged such that light emission surfaces thereof are spaced to some extent.

When the DRL light source and the turn light source need to be arranged such that the light emission surfaces thereof are close to each other, the DRL and the turn signal lamp are tuned on at the same time while making a light intensity of the turn signal lamp higher than normal so as to conform to relevant regulations.

It is necessary to provide a DC/DC converter and a control circuit for each of the DRL and the turn signal lamp such that the DRL and the turn signal lamp can be turned on at the same time.

Herein, considering a case where the light emission surfaces of the turn signal lamp and the DRL were commonly used or were closely arranged within a predetermined distance, it would be required to turn of the DRL during a blinking time period of the turn signal lamp so as to keep visibility or light emission color of the turn signal lamp.

SUMMARY

The present invention has been made in view of the above circumstances, and an aspect of the present invention provides efficient configuration of a driving circuit for a plurality of light source units configured to perform different functions, for example, a turn signal lamp and a DRL.

According to an illustrative embodiment of the present invention, there is provided a lighting circuit configured to supply a driving current to a first light source and a second light source configured to perform a function different from the first light source. The lighting circuit includes: a conversion unit configured to receive a first voltage for the first light source and a second voltage for the second light source via a common input terminal, to perform voltage conversion on the first voltage or the second voltage, and to supply the driving current from an output terminal; a control unit configured to control a current value of the driving current output from the conversion unit; a first switch configured to select whether to supply the driving current to the first light source by a first signal based on the first voltage; a signal generation unit configured to receive the first voltage and the second voltage and to generate a second signal; and a second switch configured to select whether to supply the driving current to the second light source by the second signal.

According to this configuration, it is possible to commonly use the conversion unit and the control unit for driving of the first light source and the second light source and to switch a driving target in accordance with a voltage supply state.

The above lighting circuit may further include a third switch configured to interrupt current flowing based on the second voltage to the input terminal of the conversion unit during a time period when the first voltage is supplied.

Accordingly, during a time period when the first voltage and the second voltage are supplied together, it is possible to prevent a detection error that a vehicle-side system erroneously detects that the first light source is disconnected, as the input current by the intermittent first voltage becomes unstable due to the input current by the second voltage.

In the above lighting circuit, the signal generation unit may be configured to generate the second signal such that the second switch is kept selecting not to supply the driving current to the second light source even when the second voltage which is a continuous voltage is supplied, during a time period when the first voltage which is an intermittent voltage repeating a high-level time period and a low-level time period with a predetermined cycle is supplied.

That is, when the intermittent first voltage is supplied to the first light source and the continuous second voltage is supplied to the second light source at the same time, the second signal is generated such that the first light source preferentially emits the light.

In the above lighting circuit, the signal generation unit may be configured to generate, as the second signal, a signal in which a predetermined delay time longer than the low-level time period of the first voltage is provided to a waveform of the second voltage.

That is, when the second voltage is supplied, the second signal having the delay time provided to the waveform of the second voltage waveform. Thereby, the second switch is turned on with the predetermined delay time from the supply start of the second voltage such that the second light source is enabled to emit the light.

From a state where the first voltage and the second voltage are supplied together and the first light source is blinking light emission state based on the supply of the intermittent first voltage, even when the supply of the first voltage is stopped to end blinking while the second voltage is continued to be supplied, the second light source is not enabled to immediately emit the light due to the delay time. Thereby, it is possible to clarify the ending of the blinking light emission.

In the above lighting circuit, the control unit may be configured to control the conversion unit to output the driving current having a current value for the first light source at least during a time period when the first switch selects to supply the driving current to the first light source and to output the driving current having a current value for the second light source at least during a time period when the second switch selects to supply the driving current to the second light source.

Thereby, even when the first and second light sources are driven by the common conversion unit, it is possible to supply the driving current appropriate to each of the first light source and the second light source.

The above lighting circuit may be used for a vehicle lamp device, a light emission surface of the first light source and a light emission surface of the second light source may be closely arranged or are commonly used, the first light source may serve as a turn signal lamp, and the second light source may serve as a daytime running lamp (DRL).

Thereby, it is possible to implement the appropriate light emission operations of the turn signal lamp and the DRL by the efficient driving circuit configuration.

According to the above configuration, it is possible to efficiently configure the driving circuit and to implement the appropriate light emission driving for the first light source and the second light source configured to perform different functions.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

1. First Illustrative Embodiment

Hereinafter, a vehicle lamp device including a lighting circuit according to illustrative embodiments will be described with reference to the accompanying drawings.

The first illustrative embodiment is directed to a vehicle lamp device including a lighting circuit for a turn signal lamp serving as a first light source and a DRL serving as a second light source.

Figure 1A:
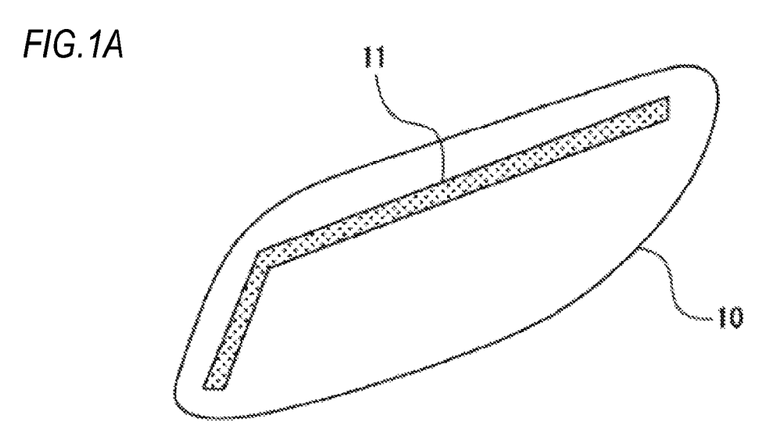
FIGS. 1A and 1B show examples of lamp light emission surfaces according to an illustrative embodiment of the present invention.
Figure 1B:
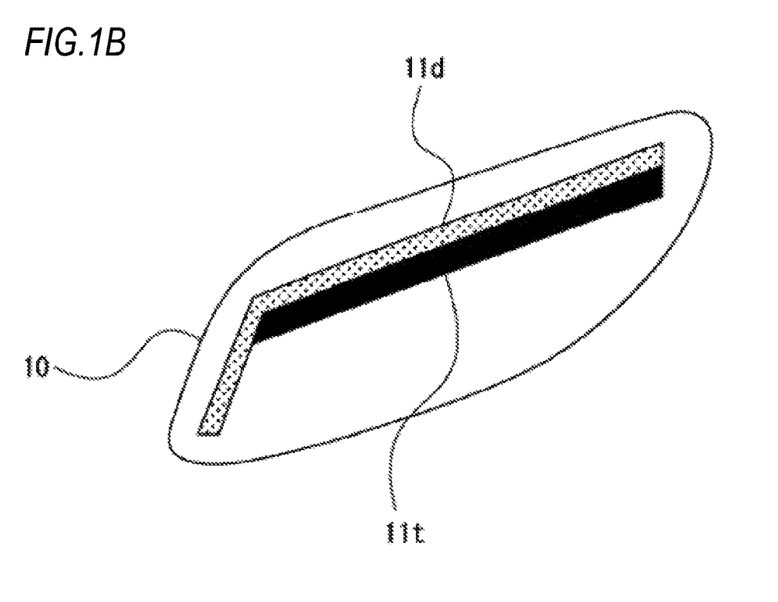

FIGS. 1A and 1B show examples of light emission surfaces of a lamp 10 configured to emit light by the lighting circuit according to the first illustrative embodiment. A light emission surface 11 of FIG. 1A is a light emission surface of a turn signal lamp and a light emission surface of a DRL, such that the light emission surface is shared.

FIG. 1B shows an example where a light emission surface 11t of the turn signal lamp and a light emission surface 11d of the DRL are closely arranged. The close arrangement refers to that the light emission surfaces are arranged within a distance where it is legally required to turn off the DRL during a blinking time period of the turn signal lamp in a country where the present invention is to be implemented.

In the first illustrative embodiment, as shown in FIGS. 1A and 1B, for example, a configuration is assumed where the light emission surfaces of the turn signal lamp and the DRL are commonly used or are closely arranged.

Figure 2:
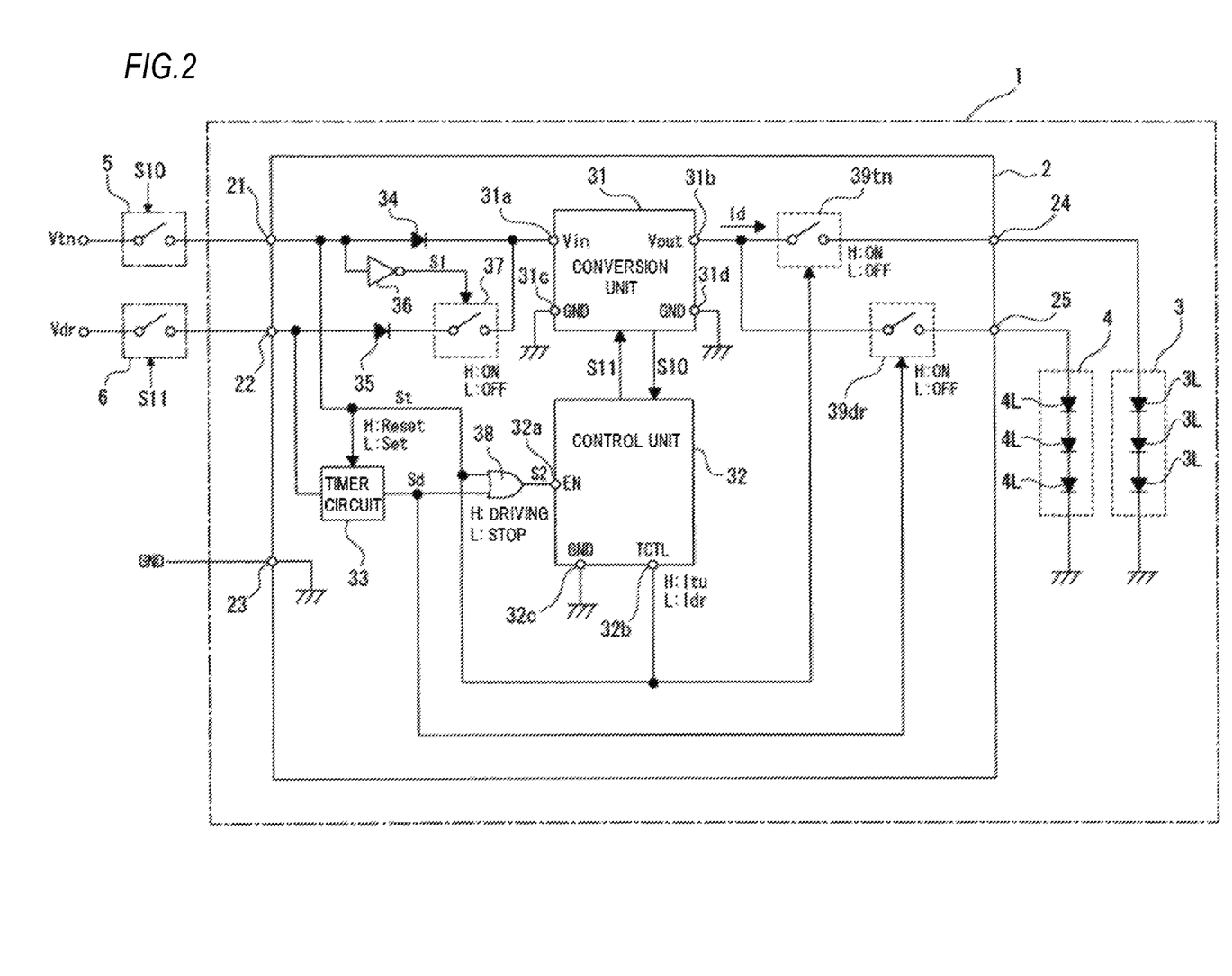
FIG. 2 is a circuit diagram of a vehicle lamp device including a lighting circuit according to an illustrative embodiment of the present invention.

FIG. 2 shows a configuration example of a vehicle lamp device 1 including a lighting circuit 2 according to an illustrative embodiment. The vehicle lamp device 1 includes the lighting circuit 2, a turn light source 3 and a DRL light source 4.

The vehicle lamp device 1 is configured such that power is to be fed thereto from a battery (not shown) of a vehicle having the vehicle lamp device 1 mounted thereon. In this case, a power supply voltage (a first voltage Vtn) for turn signal lamp light emission and a power supply voltage (a second voltage Vdr) for DRL light emission are supplied from the vehicle.

In FIG. 2, a turn switch 5 and a DRL switch 6 are shown. When instructing the turn signal lamp light emission, the turn switch 5 turns ON by a signal S10, so that the first voltage Vtn is supplied to a terminal 21 of the lighting circuit 2. Also, when instructing the DRL light emission, the DRL switch 6 turns ON by a signal S11, so that the second voltage Vdr is supplied to a terminal 22 of the lighting circuit 2.

A terminal 23 is a ground terminal and is connected to a ground line of the vehicle.

Figure 3:
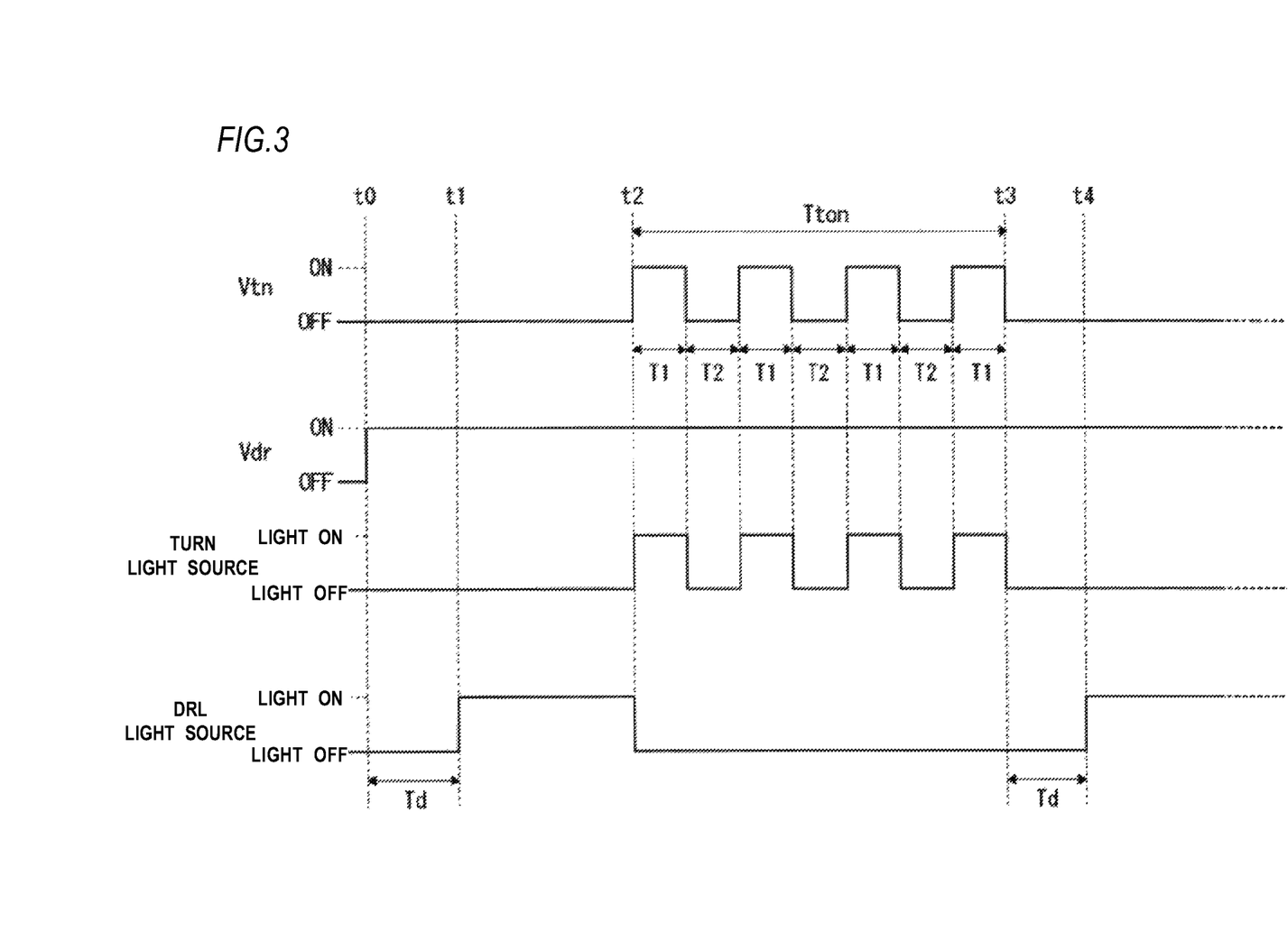
FIG. 3 shows driving states of a turn light source and a DRL light source according to an illustrative embodiment of the present invention.

As the first voltage Vtn for the turn signal lamp, as shown in FIG. 3, an intermittent voltage repeating a high-level time period T1 and a low-level time period T2 with a predetermined cycle in a turn active time period Tton is used. For example, T1=T2=350 msec.

The turn active time period Tton corresponds to a time period when a driver of the vehicle instructs (or instructs a hazard) turn signal light emission for right/left turn. That is, the first voltage Vtn is a power supply voltage for blinking as a turn signal.

A voltage in the high-level time period T1 is a battery positive terminal voltage value such as 12V, 24V or the like, and a voltage in the low-level time period T2 is a ground level (0V), for example. Therefore, for example, a battery voltage, which is periodically turned ON/OFF while the turn switch 5 is connected to a battery positive terminal voltage line and repeats ON/OFF states by the signal S10 during the turn active time period Tton, may be used as the first voltage Vtn. Alternatively, the first voltage Vtn which becomes a periodic voltage during the turn active time period Tton may be generated by a predetermined vehicle-side controller instead of the turn switch 5 and supplied to the vehicle lamp device 1.

The second voltage Vdr for DRL continuously has a predetermined voltage value (for example, a battery voltage value) during a time period when the DRL is enabled to emit the light. Therefore, when the DRL switch 6 is connected to the battery positive terminal voltage line and the DRL lighting is instructed by a driver's operation or a vehicle-side Electronic Control Unit (ECU), the DRL switch 6 turns ON by the signal S11 and the battery voltage is input to the vehicle lamp device 1, as the second voltage Vdr. The second voltage Vdr may be supplied to the vehicle lamp device 1 by a predetermined vehicle-side controller instead of the DRL switch 6, in response to a DRL lighting instruction of the driver or ECU.

In any case, when the first voltage Vtn and the second voltage Vdr are supplied from the vehicle by any method, the vehicle lamp device 1 enables the turn light source 3 and the DRL light source 4 to emit the light in response to the inputs of the first voltage Vtn and the second voltage Vdr.

In the vehicle lamp device 1 of FIG. 2, the turn signal lamp and the DRL are connected to the vehicle side only via the terminals 21, 22, 23.

The first voltage Vtn is a power supply voltage for turn signal light emission and serves as a turn signal light emission instruction. The second voltage Vdr is a power supply voltage for DRL light emission and serves as a DRL light emission instruction. That is, signals of the turn signal light emission instruction and the DRL light emission instruction are not supplied separately from the first voltage Vtn or the second voltage Vdr.

As described later, the vehicle lamp device 1 according to the first illustrative embodiment implements the appropriate light emission driving of the turn light source 3 and the DRL light source 4 by the simple connection configuration with the vehicle, i.e., the three wire connections of the line of the first voltage Vtn, the line of the second voltage Vdr and the ground line.

In the vehicle lamp device 1, the turn light source 3 is configured by a plurality of LEDs 3L connected in series. In FIG. 2, the three LEDs 3L are connected in series. The number of the light-emitting diodes configuring the turn light source 3 may be any number of 1 or greater. In the turn light source 3, an anode-side of the LEDs 3L connected in series is connected to a terminal 24 of the lighting circuit 2, and a cathode-side is connected to the ground.

The DRL light source 4 is configured by a plurality of LEDs 4L connected in series. In FIG. 2, the three LEDs 4L are connected in series. The number of the light-emitting diodes configuring the DRL light source 4 may be any number of 1 or greater. The number of LEDs may be different from that of the turn light source 3.

In the DRL light source 4, an anode-side of the LEDs 4L connected in series is connected to a terminal 25 of the lighting circuit 2, and a cathode-side is connected to the ground.

In the meantime, the turn light source 3 and the DRL light source 4 may have a configuration where one or more LEDs connected in series are connected in parallel.

The lighting circuit 2 includes a conversion unit 31, a control unit 32, a timer circuit 33, diodes 34, 35, an inverter 36, a switch 37, an OR gate 38, a turn-side switch 39tn and a DRL-side switch 39dr.

The terminal 21 to which the first voltage Vtn is to be supplied is connected to an input terminal 31a of the conversion unit 31 via the diode 34.

The terminal 22 to which the second voltage Vdr is to be supplied is connected to the input terminal 31a of the conversion unit 31 via the diode 35 and the switch 37.

The terminal 21 is connected with the inverter 36, and the switch 37 turns ON/OFF by an output of the inverter 36.

The switch 37 turns ON when the output of the inverter 36 is a High: H-level and turns OFF when the output of the inverter 36 is a Low: L-level.

The conversion unit 31 is a DC/DC converter and is configured to perform voltage conversion for an input voltage Vin between the input terminal 31a and a ground terminal 31c and to generate an output voltage Vout between an output terminal 31b and a ground terminal 31d. That is, the conversion unit 31 is configured to set, as the input voltage Vin, a battery voltage as the first voltage Vtn or the second voltage Vdr, and to generate the output voltage Vout, which is an LED driving voltage of the turn light source 3 or the DRL light source 4, by using the input voltage Vin.

Various configurations of the conversion unit 31 may be considered. For example, the conversion unit 31 may include a switching regulator or a series regulator. Further, an insulation type or a non-insulation type may be employed. Also, a boost converter, a buck converter or a boost/buck converter may be employed as the DC/DC converter although it depends on a relation between the battery voltage and a forward drop voltage of the turn light source 3 or the DRL light source 4 and a situation at the battery voltage drop.

The current based on the output voltage Vout appearing at the output terminal 31b of the conversion unit 31 flows from the terminal 24 to the turn light source 3 via the turn-side switch 39tn, as a driving current Id. The driving current Id flows from the terminal 25 to the DRL light source 4 via the DRL-side switch 39dr.

The control unit 32 is configured to control a current value of the driving current Id of the conversion unit 31. For example, the control unit 32 is configured by an Integrated Circuit (IC). The control unit 32 and the conversion unit 31 may be integrally configured.

The control unit 32 is configured to control the conversion unit 31 such that the driving current Id having a predetermined current value is supplied to the turn light source 3 and the DRL light source 4. Specifically, the control unit 32 is configured to output a control signal S11 to the conversion unit 31 and to perform current value control and stabilization control of the driving current Id, based on a detection signal S10 of the output current (the driving current) of the conversion unit 31. For example, when the conversion unit 31 is a switching regulator, the control unit 32 generates, as the control signal S11, a PWM switching control signal based on the current detection signal S10 and a predetermined reference signal (a target value), thereby performing the current value control and stabilization control of the driving current Id.

The control unit 32 is provided with an enable terminal 32a and is configured to control operations of the conversion unit 31 in accordance with a terminal voltage of the enable terminal 32a. Herein, the control unit 32 drives the conversion unit 31 serving as the DC/DC converter when the terminal voltage of the enable terminal 32a is an H-level and stops the driving of the conversion unit 31 serving as the DC/DC converter when the terminal voltage of the enable terminal 32a is an L-level.

The control unit 32 is provided with a current value setting terminal 32b and is configured to control the current value of the driving current Id from the conversion unit 31 in accordance with a terminal voltage of the current value setting terminal 32b. Herein, it is assumed that a value of the driving current Id is set as a current value Itu for turn signal lamp when the terminal voltage of the current value setting terminal 32b is an H-level and a value of the driving current Id is set as a current value Idr for DRL when the terminal voltage of the current value setting terminal 32b is an L-level. For example, in order to generate the PWM switching control signal, the control unit 32 is configured to change and set a target value, which is to be compared with the current detection signal S10, to any one of the reference signal for turn signal lamp and the reference signal for DRL in accordance with the terminal voltage of the current value setting terminal 32b, thereby switching a current value of the driving current Id to the current value Itu for turn signal lamp/the current value Idr for DRL. In the meantime, the current value Itu for turn signal lamp is less than the current value Idr for DRL (Itu<Idr), for example. However, the current value Itu for turn signal lamp may be greater than the current value Idr for DRL (Itu>Idr) or both may be the same (Itu=Idr).

The terminal 32c is a ground terminal.

As described above, the first voltage Vtn also serves as an instruction signal of the turn signal light emission. The first voltage Vtn which is to be supplied to the terminal 21 is input to the OR gate 38, as a signal St, is also input to the current value setting terminal 32b and serves as a control signal of the turn-side switch 39tn. The signal St (the first voltage Vtn) serves as a set/reset control signal of the timer circuit 33.

The second voltage Vdr also serves as an instruction signal of the DRL light emission. The second voltage Vdr that is to be supplied to the terminal 22 serves as a signal Sd via the timer circuit 33. The timer circuit 33 is configured to delay a waveform of the second voltage Vdr by a delay time Td (described later) by counting predetermined time and to set the same as a signal Sd. The count of the timer circuit 33 is reset during a time period when the signal St (the first voltage Vtn) is an H-level, and is set when the signal St becomes an L-level. That is, the timer circuit 33 is configured to execute the count-up during an L-level time period of the signal St.

The signal Sd from the timer circuit 33 is input to the OR gate 38 and serves as a control signal of the DRL-side switch 39dr.

The OR gate 38 is configured to provide a logical sum of the signals St, Sd to the enable terminal 32a of the control unit 32.

During an H-level time period of the signal St, the turn-side switch 39tn turns ON and is configured to supply the driving current Id from the conversion unit 31 to the turn light source 3, thereby enabling the turn light source 3 to emit the light. During an L-level time period of the signal St, the turn-side switch 39tn turns OFF, so that the driving current Id is not supplied to the turn light source 3 even though the conversion unit 31 is driving.

During an H-level time period of the signal Sd, the DRL-side switch 39dr turns ON and is configured to supply the driving current Id from the conversion unit 31 to the DRL light source 4, thereby enabling the DRL light source 4 to emit the light. During an L-level time period of the signal Sd, the DRL-side switch 39dr turns OFF, so that the driving current Id is not supplied to the DRL light source 4 even though the conversion unit 31 is driving.

The operations of the vehicle lamp device 1 are described. First, a case where the DRL-side second voltage Vdr is supplied as an ON-level (for example, a battery positive terminal voltage) and the turn-side first voltage Vtn is OFF (for example, a ground level) is described. This corresponds to an operation during a time period of time points t0 to t2. In this case, the operations of the respective units are as follows.

Since the first voltage Vtn is OFF and an output of the inverter 36 is an H-level, the switch 37 turns ON. Therefore, the second voltage Vdr supplied to the terminal 22 is supplied to the input terminal 31a of the conversion unit 31.

Since the signal St is an L-level, the turn-side switch 39tn turns OFF.

At time point t0 of FIG. 3, the second voltage Vdr turns ON. At this time, since the signal St is an L-level, the timer circuit 33 performs the count and applies the delay time Td to the waveform of the second voltage Vdr to make the signal Sd. By the signal Sd, the enable terminal 32a becomes an H-level voltage at time point t1. Also, by the signal Sd, the DRL-side switch 39dr turns ON from time point t1.

Therefore, after time point t1, the conversion unit 31 is driven, the driving current Id is supplied to the DRL light source 4, and the DRL light source 4 is turned on.

At this time, since the current value setting terminal 32b is an L-level, the control unit 32 controls the conversion unit 31 such that the current value of the driving current Id becomes the current value Idr for DRL. Thereby, the DRL light source 4 emits the light having brightness set for the DRL.

Subsequently, a case where an intermittent power supply voltage is input as the first voltage Vtn for the turn signal lamp is described. In this case, even when the second voltage Vdr for DRL is supplied, the DRL light source 4 is turned off.

During a time period when the second voltage Vdr is not supplied, the DRL-side switch 39dr turns OFF and the DRL light source 4 does not emit the light.

FIG. 3 shows a case where a time period of time points t2 to t3 becomes the turn active time period Tton and the intermittent first voltage Vtn is supplied while the second voltage Vdr remains ON.

During the turn active time period Tton, the first voltage Vtn repeats the high-level time period T1 and the low-level time period T2 with a predetermined cycle.

In the lighting circuit 2, the low-level time period T2 of the first voltage Vtn and the supply off-time period (a time period except for the turn active time period Tton) cannot be distinguished. This is because a control signal except for the first voltage Vtn is not input from the vehicle.

When the turn active time period Tton starts at time point t2, since the timer circuit 33 is reset during the high-level time period T1, the signal Sd becomes an L-level. Therefore, the DRL-side switch 39dr turns OFF, so that the DRL light source 4 is turned off.

During the high-level time period T1, the signal St is an H-level. Therefore, even when the signal Sd becomes an L-level, the enable terminal 32a becomes an H-level and the conversion unit 31 is driven. Also, the turn-side switch 39tn turns ON.

Therefore, after time point t2, during the high-level time period T1, the conversion unit 31 is driven, the driving current Id is supplied to the turn light source 3, and the turn light source 3 is turned on.

At this time, since the current value setting terminal 32b is an H-level, the control unit 32 controls the conversion unit 31 such that the current value of the driving current Id becomes the current value Itu for turn signal lamp. Thereby, the turn light source 3 emits the light having brightness set for the turn signal lamp.

During the low-level time period T2 of the first voltage Vtn, the enable terminal 32a turns an L-level, so that the conversion unit 31 stops. Also, the turn-side switch 39tn turns OFF. Therefore, the turn light source 3 is turned off.

Accordingly, the high-level time period T1 and the low-level time period T2 are repeated, so that the turn light source 3 blinks as the turn signal.

In the meantime, during the low-level time period T2, since the output of the inverter 36 is an H-level and the switch 37 turns ON, the second voltage Vdr is supplied to the conversion unit 31. However, during the corresponding time period, since the conversion unit 31 stops, the driving current Id is not output. During the low-level time period T2, even when the second voltage Vdr is supplied, the enable terminal 32a is an L-level. This is because the signal Sd is kept at an L-level during the low-level time period T2, as described later. Therefore, the DRL-side switch 39dr is also kept at the OFF state.

Subsequently, an operation which is performed when the turn active time period Tton is over at time point t3 is described.

In FIG. 3, the supply of the first voltage Vtn is over at time point t3. At this time, even when the second voltage Vdr is supplied, the DRL light source 4 is not turned on immediately.

The last high-level time period T1 of the turn active time period Tton is over at time point t3 and the reset state of the timer circuit 33 is released, so that the signal Sd has the delay time Td and turns an H-level. Therefore, at time point t4, the enable terminal 32a turns an H-level and the DRL-side switch 39dr turns ON.

Therefore, after time point t4, the conversion unit 31 is driven and the driving current Id is supplied to the DRL light source 4, so that the DRL light source 4 is turned on. At this time, since the current value setting terminal 32b is an L-level, the control unit 32 controls the conversion unit 31 such that the current value of the driving current Id becomes the current value Idr for DRL.

Thereby, when the delay time Td elapses after the turn active time period Tton is over, the DRL light source 4 resumes emitting the light having brightness for the DRL.

Subsequently, an operation for preferentially enabling the turn light source 3 to emit the light during the turn active time period Tton as described above is described in detail with reference to FIGS. 4 and 5.

In the first illustrative embodiment, the appropriate light emission driving is implemented by the setting of the delay time Td (generation of the signal Sd) by the timer circuit 33 and the set/reset control by the signal St of the timer circuit 33.

Figure 4:
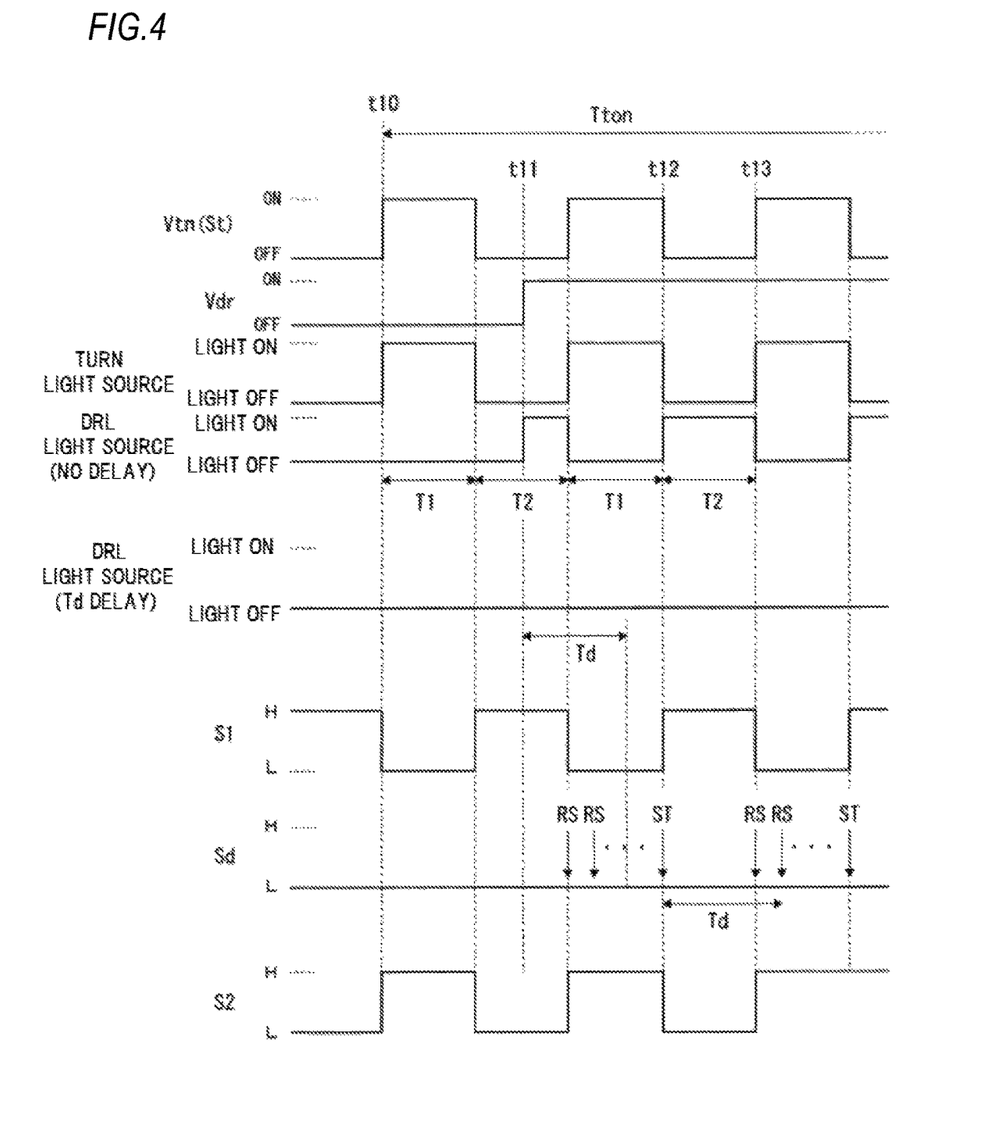
FIG. 4 shows that a DRL power supply voltage is supplied during supply of a turn power supply voltage according to an illustrative embodiment of the present invention.

In FIG. 4, a case where the supply of the second voltage Vdr for DRL starts during the turn active time period Tton is described. FIG. 4 shows the first voltage Vtn (=the signal St), the second voltage Vdr, the lighting state of the turn light source 3, the lighting states of the DRL light source 4 (no delay and Td delay) and the signals S1, Sd, S2.

As shown in FIG. 4, the turn light source 3 blinks by the supply (the high-level time period T1, the low-level time period T2) of the intermittent first voltage Vtn after time point t10.

Now, it is assumed that the supply of the second voltage Vdr starts at time point t11 in the low-level time period T2.

Here, '(no delay)' indicates the lighting state of the DRL light source 4 when the delay time of the timer circuit 33 is zero. However, it is assumed that the set/reset of the timer circuit 33 by the signal St is being performed.

In the case of (no delay), during the low-level time period T2, since the DRL-side switch 39dr turns ON and the enable terminal 32a turns an H-level by the waveform (an H-level) of the second voltage Vdr, the DRL light source 4 is turned on.

It is necessary to avoid the situation where the DRL light source 4 is turned on in this way during the turn active time period Tton since the visibility of the turn signal is deteriorated.

Therefore, in the first illustrative embodiment, as described above, the timer circuit 33 is configured to generate the signal Sd having the delay time Td and the set/reset of the timer circuit 33 is performed by the signal St.

As a result, even when the supply of the second voltage Vdr starts during the turn active time period Tton, the signal Sd continues to be an L-level and the DRL light source 4 continues to be at the light-off state as shown with '(Td delay)' in FIG. 4.

This is because even when the second voltage Vdr is supplied at time point t11, the signal Sd is not an H-level until the delay time Td elapses and the high-level time period T1 arrives before the delay time Td elapses, so that the timer circuit 33 is reset (an arrow RS).

The timer circuit 33 is continuously reset during the high-level time period T1. Also, the timer circuit 33 starts the count (an arrow ST) at time point t12 in the next low-level time period T2. However, before reaching the count of the delay time Td, the high-level time period T1 arrives at time point t13, so that the count is reset. Therefore, the signal Sd continues to be the L-level.

Figure 5:
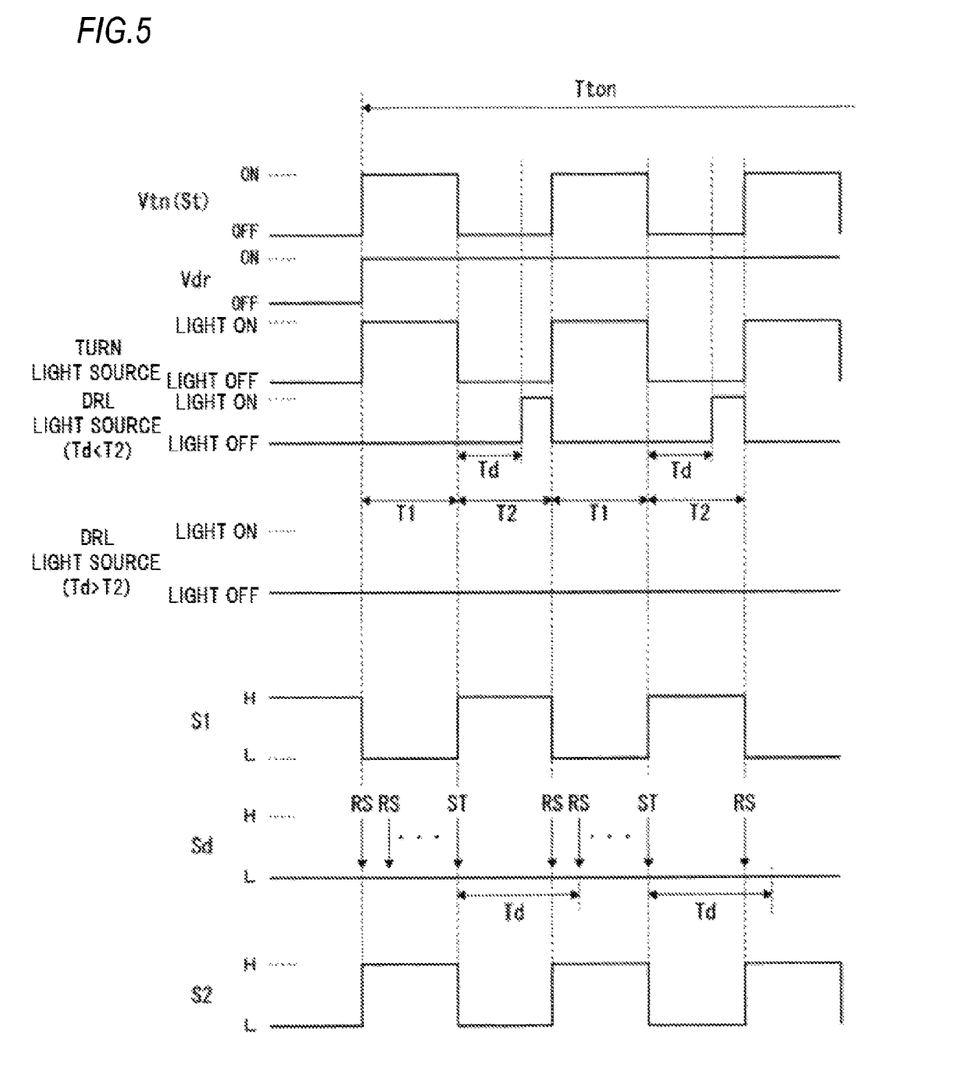
FIG. 5 shows that the turn power supply voltage and the DRL power supply voltage are supplied at the same time according to an illustrative embodiment of the present invention.

FIG. 5 shows the same waveforms as FIG. 4. FIG. 5 shows cases where the delay time Td is appropriate and is not appropriate when the first voltage Vtn and the second voltage Vdr are supplied at the same time.

Regarding the lighting state of the DRL light source 4, '(Td<T2)' indicates a case where the delay time Td by the timer circuit 33 is shorter than the low-level time period T2 and '(Td>T2)' indicates a case where the delay time Td is longer than the low-level time period T2.

If Td<T2, the signal Sd turns an H-level before the low-level time period T2 is over. Then, since the DRL-side switch 39dr turns ON and the enable terminal 32a is an H-level, the DRL light source 4 is turned on for a short time.

In contrast, when the setting of (Td>T2) is made, the signal Sd is not an H-level during the low-level time period T2, as shown in FIG. 5. Therefore, the situation where the DRL light source 4 is turned on for a short time during the turn active time period Tton is prevented.

From the examples shown in FIGS. 4 and 5, it can be appreciated that it is appropriate that the delay time Td by the count of the timer circuit 33 is longer than the low-level time period T2.

In the first illustrative embodiment, the switch 37 is turned on/off by the output of the inverter 36. This is to prevent a detection error in abnormal determination of the turn light source 3 at the vehicle-side.

In a recent vehicle-side system, it is determined whether a lamp device is normal or abnormal (disconnection) by a value of current flowing into the vehicle lamp device. For example, as described above, the disconnection abnormality of the turn signal lamp is determined by detecting a value of the current flowing into the vehicle lamp device 1 when the vehicle-side controller supplies the first voltage Vtn to the vehicle lamp device 1.

Figure 6A:
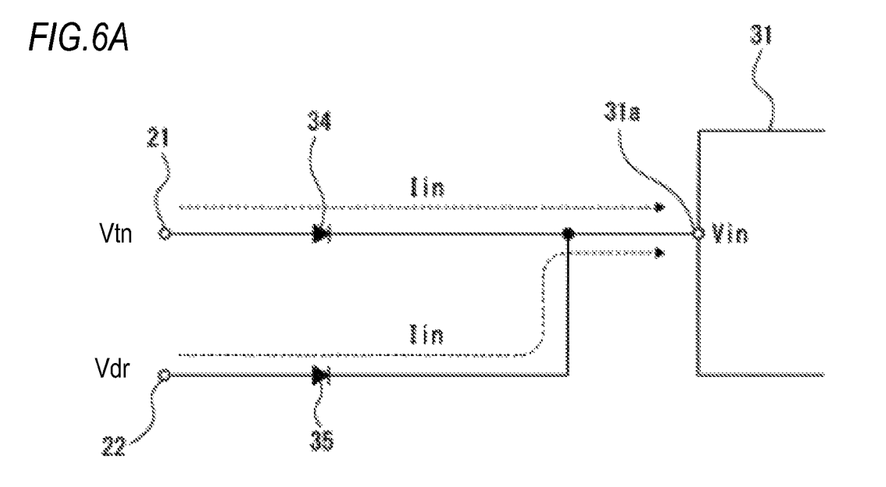
FIGS. 6A and 6B show current path interruption from a DRL power supply upon the supply of the turn power supply voltage according to an illustrative embodiment of the present invention.

Herein, it is assumed that the switch 37 is not provided, considering a case where the first voltage Vtn and the second voltage Vdr are supplied together. In this case, as shown in FIG. 6A, the current Iin flows from both the first voltage Vtn-side and the second voltage Vdr-side. In this case, a detection value of the current by the first voltage Vtn is not constant, so that the vehicle-side controller may determine that the disconnection has occurred even though the turn light source 3 is normally turned on.

Figure 6B:
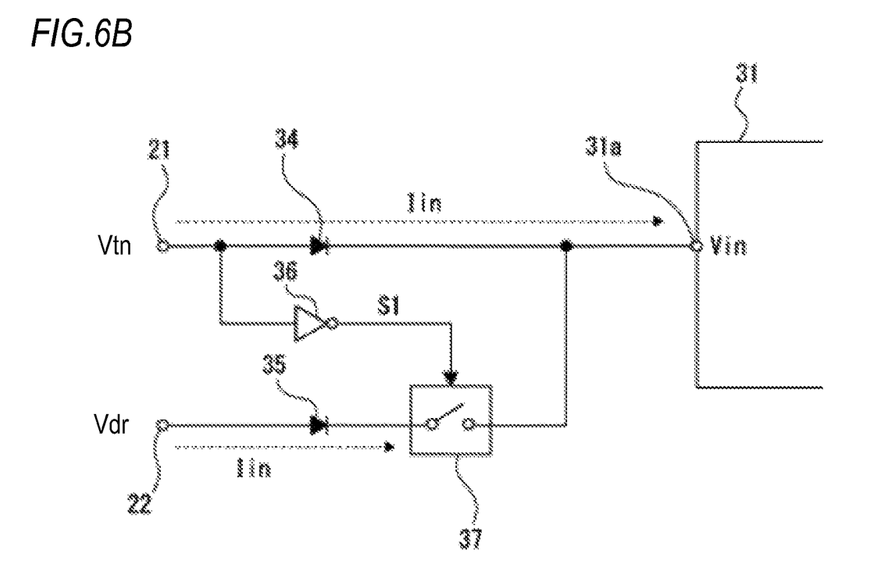

In order to prevent this situation, the switch 37 is provided and is set to be OFF while the first voltage Vtn is supplied, so that the current Iin is disabled from flowing from the second voltage Vdr-side, as shown in FIG. 6B. That is, the current Iin is enabled to flow only from the first voltage Vtn-side at the lighting of the turn light source 3, so that the detection error at the vehicle-side can be prevented.

2. Second Illustrative Embodiment

In the below, an example of the specific configuration of the conversion unit 31 according to a second illustrative embodiment is described with reference to FIG. 7.

As described above, the conversion unit 31 can be configured in various manners. Herein, an example where a boost chopper-type converter is used as the conversion unit 31 is described. In FIG. 7, the same configurations as those in FIG. 2 are denoted with the same reference numerals and the descriptions thereof are omitted. As shown in FIG. 7, the lighting circuit 2 includes a setting signal circuit 40 for the current value setting terminal 32b of the control unit 32 in addition to the conversion unit 31, the control unit 32, the turn-side switch 39tn and the DRL-side switch 39dr. The other units (not shown) (the timer circuit 33, the diode 34, 35, the inverter 36, the switch 37 and the OR gate 38) are provided in the same manner as FIG. 2.

Figure 7:
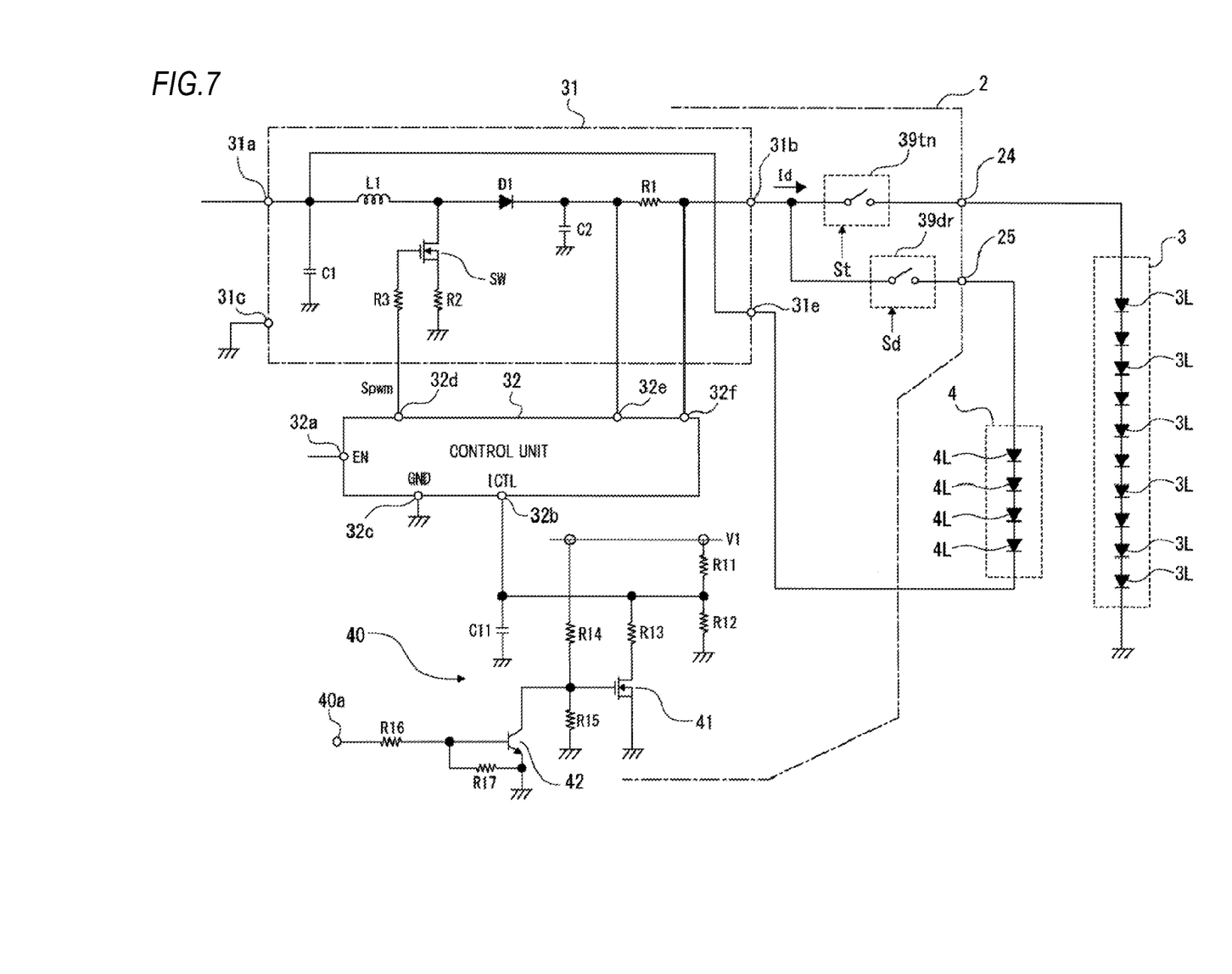
FIG. 7 is a circuit diagram showing a specific circuit example of a conversion unit according to an illustrative embodiment of the present invention.

In the example of FIG. 7, the turn light source 3 includes ten LEDs 3L connected in series, and the DRL light source 4 includes four LEDs 4L connected in series.

The conversion unit 31 is configured to convert an input voltage (the first voltage Vtn, the second voltage Vdr) between the input terminal 31a and the ground terminal 31c, to generate an output voltage, and to supply the driving current Id from the output terminal 31b to the turn light source 3 or the DRL light source 4 based on the output voltage. The turn-side switch 39tn and the DRL-side switch 39dr are turned on/off by the signals St, Sd, similarly to the configuration of FIG. 2.

The conversion unit 31 serving as the DC/DC converter includes an inductor L1, a switch SW, a rectification diode D1, resistances R1, R2, R3 and capacitors C1, C2, and is configured as a boost/non-insulation switching regulator. As shown in FIG. 7, one end of the inductor L1 is connected to the input terminal 31a (the power supply voltage positive terminal), and the other end of the inductor L1 is connected to an anode of the rectification diode D1.

The switch SW is connected between a connection point of the inductor L1 and the rectification diode D1 and the resistance R2, and the other end of the resistance R2 is connected to the ground (the ground terminal 31c). The switch SW is configured by a switching element such as a Metal-Oxide-Semiconductor Field-Effect Transistor (MOSFET) or the like. A gate of the switch SW is supplied with a switching control signal Spwm from the terminal 32d of the control unit 32 via the resistance R3.

The capacitor C1 is connected between the input terminal 31a and the ground terminal 31c.

Since the capacitor C2 is configured to function as a smoothing capacitor, it is connected between a cathode-side of the rectification diode D1 and the ground terminal 31c.

The resistance R1 is a resistance for current detection, and one end thereof is connected to a connection point of the cathode of the rectification diode D1 and the capacitor C2, and the other end is connected to the output terminal 31b. A voltage between both ends of the resistance R1 is input from the terminals 32e, 32f to the control unit 32, and the control unit 32 is configured to detect the current value of the driving current Id from the voltage between both ends.

The control unit 32 is configured as an IC for LED driving, for example. The control unit 32 is configured to generate an error signal for a target constant current value from the voltage between both ends of the resistance R1, and to control a switching operation of the switch SW based on the error signal such that the current value of the driving current coincides with the target value. Thereby, the constant current of the driving current Id is controlled. That is, the control unit 32 is configured to generate the switching control signal Spwm for controlling the ON/OFF operation (switching operation) of the switch SW such that the current value of the driving current Id coincides with the target value (the current value Itu for turn signal lamp or the current value Idr for DRL). Specifically, the control unit 32 is configured to control an on-duty of the switching control signal Spwm, thereby performing the constant current control. Thereby, the driving current Id having a predetermined current value based on the output voltage of the conversion unit 31 is enabled to flow to the LEDs (3L or 4L) of the turn light source 3 or the DRL light source 4, so that the respective LEDs (3L or 4L) emit the light.

In this example, the cathode terminal of the LEDs 3L as the turn light source 3 is connected to the ground. On the other hand, the cathode terminal of LEDs 4L as the DRL light source 4 is connected to the terminal 31a (the power supply voltage line) via the terminal 31e.

This is to raise a cathode potential of the DRL light source 4, considering the configuration where the conversion unit 31 is configured as the boost-type DC/DC converter. When a summed value of the forward voltages of the respective LEDs 4L of the DRL light source 4 is less than the input voltage (the battery voltage) of the conversion unit 31, the conversion unit 31 cannot control the driving current Id for driving the LEDs 4L, so that the excessive current flows to the respective LEDs 4L. Therefore, in order to control the driving current Id for the LEDs 4L to a desired value, the cathode potential is raised.

In the control unit 32, the target value of the driving current Id is set by the terminal voltage (H/L) of the current value setting terminal 32b.

In the example of FIG. 2, the signal St (the first voltage Vtn) is input to the current value setting terminal 32b. In the example of FIG. 7, the terminal voltage of the current value setting terminal 32b is set by the setting signal circuit 40.

Contrary to the example of FIG. 2, the control unit 32 sets the current value Idr for DRL as the target value when the terminal voltage of the current value setting terminal 32b is an H-level and sets the current value Itu for turn signal lamp as the target value when the terminal voltage of the current value setting terminal 32b is an L-level.

The setting signal circuit 40 includes resistances R11 to R17, an N-channel FET 41, an NPN-type bipolar transistor 42 and a capacitor C11. The voltage V1 is a predetermined voltage which is to be generated by the control unit 32, for example.

The resistances R11, R12 are connected between the voltage V1 line and the ground, and the resistance R13 and the FET 41 are connected in series between a voltage-division point of the resistances R11, R12 and the ground. The capacitor C11 is connected between the current value setting terminal 32b and the ground so as to remove a noise. The voltage of the current value setting terminal 32b is set by the resistances R11, R12, R13, depending on ON/OFF states of the FET 41.

A gate of the FET 41 is connected to a connection point of the resistances R14, R15 and a collector of the bipolar transistor 42. The resistances R14, R15 are connected between the voltage V1 line and the ground. An emitter of the bipolar transistor 42 is connected to the ground, and a base is connected to the terminal 40a via the resistance R16. The resistance R17 is connected between the base and the emitter of the bipolar transistor 42.

The terminal 40a is supplied with the signal Sd, for example. During a time period when the signal Sd is an H-level, i.e., the DRL-side switch 39dr is ON, since the bipolar transistor 42 turns ON and the FET 41 turns OFF, the voltage of the current value setting terminal 32b is an H-level. In this case, the control unit 32 sets the current value Idr for DRL as the target value of the driving current Id.

A time period when the signal Sd is an L-level, i.e., the DRL-side switch 39dr is OFF includes a time period when the turn-side switch 39tn is ON. However, in this case, since the bipolar transistor 42 turns OFF and the FET 41 turns ON, the voltage of the current value setting terminal 32b is an L-level. Thereby, the control unit 32 sets the current value Itu for turn signal lamp as the target value of the driving current Id.

3. Overview

As described with the first and second illustrative embodiments, the lighting circuit 2 is a lighting circuit for the first light source (the turn light source 3) and the second light source (the DRL light source 4) configured to perform the light emission function different from the first light source. The lighting circuit 2 includes the conversion unit 31, the control unit 32, the first switch (the turn-side switch 39tn), the signal generation unit (the timer circuit 33), and the second switch (the DRL-side switch 39dr).

The conversion unit 31 of the lighting circuit 2 is configured to receive the first voltage (Vtn) for the first light source and the second voltage (Vdr) for the second light source via the common input terminal 31a, to perform the voltage conversion on the first voltage (Vtn) or the second voltage (Vdr) and to output the driving current Id from the output terminal 31b. The control unit 32 is configured to control the current value of the driving current Id of the conversion unit 31. The first switch (the turn-side switch 39tn) is configured to select whether to supply the driving current Id to the first light source by the first signal (the signal St) based on the first voltage (Vtn). The signal generation unit (the timer circuit 33) is configured to receive the first voltage (Vtn) and the second voltage (Vdr) and to generate the second signal (the signal Sd). The second switch (the DRL-side switch 39dr) is configured to select whether to supply the driving current Id to the second light source by the second signal (the signal Sd).

According to the above configuration, it is possible to commonly use the conversion unit 31 and the control unit 32 for driving of the first light source (the turn light source 3) and the second light source (the DRL tight source 4) and to switch the driving target in accordance with the supply state of the power supply voltage. In particular, the first and second voltages (Vtn, Vdr) are the power supply for light emission. When the first and second voltages are supplied as the signal for light emission instruction, i.e., without the instruction signal from the vehicle-side, it is possible to perform the light emission driving by appropriately switching the first light source and the second light source with the lighting circuit 2 to which the power supply and the ground line are connected.

Therefore, it is possible to simplify the configuration of the lighting circuit 2 with respect to the two light sources where the lighting is not made at the same time, thereby reducing cost.

The lighting circuit 2 further includes the third switch (the switch 37) configured to interrupt the current flowing based on the second voltage (Vdr) to the input terminal 31a of the conversion unit 31 during the time period when the first voltage (Vtn) is supplied.

Accordingly, it is possible to prevent a detection error that the vehicle-side system erroneously detects that the first light source is disconnected, as the input current by the first voltage (Vtn) is not constant due to the input current by the second voltage (Vdr). That is, it is possible to appropriately detect the disconnection of the turn light source 3 at the vehicle-side.

Further, the signal generation unit (the timer circuit 33) is configured to generate the second signal (Sd) such that the second switch (the DRL-side switch 39dr) is kept selecting not to supply the driving current to the second light source (kept at the OFF state) even when the second voltage (Vdr) which is the continuous voltage is supplied during the time period when the first voltage (Vtn) which is the intermittent voltage repeating the high-level time period T1 and the low-level time period T2 with the predetermined cycle is supplied.

Accordingly, when the first voltage (Vtn) for the first light source and the second voltage (Vdr) for the second light source are supplied together, the first light source preferentially emits the light. Specifically, as shown in FIG. 4, the light emission of the turn light source 3 is preferentially performed and the DRL light source 4 is disabled from emitting the light during the turn active time period Tton. Thereby, the appropriate light emission operations of the turn signal lamp and the DRL are implemented.

Further, the signal generation unit (the timer circuit 33) is configured to generate, as the second signal, the signal Sd in which the predetermined delay time Td longer than the low-level time period T2 of the first voltage (Vtn) is provided to the waveform of the second voltage (Vdr). That is, the DRL-side switch 39dr becomes ON with the predetermined delay time Td from the supply start of the second voltage (Vdr), thereby enabling the DRL light source 4 to emit the light.

By making the delay time Td longer than the low-level time period T2, it is possible to prevent the lighting from the DRL light source 4 for a short time during the blinking of the turn light source 3, as described above with reference to FIG. 5.

Particularly, in the illustrative embodiments, the count operation of the timer circuit 33 is set/reset by the signal St, so that the instantaneous lighting is appropriately prevented.

At the state where the first voltage (Vtn) and the second voltage (Vdr) are supplied together, when the first light source (the turn light source 3) is switched from the blinking light emission to the ending state (time point t4 in FIG. 3) of the blinking light emission due to the supply stop of the first voltage (Vtn), the signal generation unit (the timer circuit 33) generates the second signal (Sd) for turning on the second switch after the predetermined time elapses (time point t4) from the ending timing of the blinking light emission.

That is, even when the second voltage (Vdr) is supplied at the time that the blinking light emission of the turn light source 3 is over, the DRL light source 4 is not enabled to immediately start the light emission. Thereby, it is possible to clarify the ending of the turn blinking light emission. In particular, after the turn active time period Tton, the DRL light source 4 starts the light emission when the delay time Td longer than the low-level time period T2 elapses. Therefore, the ending of the turn blinking light emission is further clarified.

In the illustrative embodiments, as described above, the instantaneous lighting of the DRL in the turn active time period Tton is prevented and the DRL is enabled to emit the light with the predetermined delay time Td after the turn active time period Tton by the signal Sd from the one timer circuit 33. Thereby, it is possible to efficiently generate the signal and to save the cost by the simple configuration.

Further, the control unit 32 is configured to output the driving current Id having the current value Itu for the turn light source 3 at least during the time period when the turn-side switch 39tn is ON, i.e., during the time period when the turn-side switch 39tn selects to supply the driving current Id to the first light source (the turn light source 3). Also, the control unit 32 is configured to control the conversion unit 31 to output the driving current Id having the current value Idr for the DRL light source 4 at least during the time period when the DRL-side switch 39dr is ON, i.e., during the time period when the DRL-side switch 39dr selects to supply the driving current Id to the second light source (the DRL light source 4).

Thereby, it is possible to implement the light emission having brightness appropriate as the turn signal lamp and the DRL.

In the illustrative embodiments, the inventive concept of the present invention is applied to the two light sources 3, 4 which are the turn signal lamp and the daytime running lamp. Therefore, it is possible to select the turn signal light emission and the DRL light emission and to implement the preferential lighting of the turn signal lamp and the light emission operation considering the relation between the turn signal lamp and the DRL by the simple lighting circuit configuration.

The present invention is not limited to the circuit configurations and operations of the illustrative embodiments. The circuit configurations of FIGS. 2 and 7 are just exemplary, and various specific configurations can be appreciated.

In the illustrative embodiments, the turn signal lamp and the DRL have been exemplified as the first and second light sources. However, the inventive concept of the present invention can also be applied to other combinations such as the turn signal lamp and a clearance lamp (CLL).

Further, a CLL and a lighting circuit thereof may be incorporated into the vehicle lamp device 1 having the configuration of FIG. 2.

In the illustrative embodiments, the first light source (the turn light source 3) and the second light source (the DRL light source 4) are connected in parallel with the conversion unit 31 but may be connected in series.

For example, the first light source and the second light source are connected in series between the output terminal 31b of the conversion unit and the ground. A first bypass switch is connected in parallel with the first light source. Also, a second bypass switch is connected in parallel with the second light source.

In this case, when the first switch turns OFF, the driving current is supplied to the first light source, and when the second switch turns OFF, the driving current is supplied to the second light source.

Therefore, the first switch and the second switch are respectively turned on/off by the first signal St and the second signal Sd, so that the operations described in the illustrative embodiments are implemented. In this case, meanwhile, since the first and second switches are the bypass switches, the relation between the logic levels of the first and second signals and the ON/OFF of the first and second switches is opposite to the illustrative embodiments.

What is claimed is:

1. A lighting circuit configured to supply a driving current to a first light source and a second light source configured to perform a function different from the first light source, the lighting circuit comprising:

a first input terminal configured to receive a first voltage for the first light source;

a second input terminal configured to receive a second voltage for the second light source;

a conversion unit including a common input terminal configured to receive the first voltage from the first input terminal and the second voltage from the second input terminal, and an output terminal, the conversion unit being configured to perform voltage conversion on the first voltage from the first input terminal or the second voltage from the second input terminal to supply the driving current from the output terminal;

a control unit configured to control a current value of the driving current output from the output terminal of the conversion unit; a first switch configured to select whether to supply the driving current output from the output terminal of the conversion unit to the first light source by a first signal based on the first voltage;

a signal generation unit configured to receive the first voltage and the second voltage and to generate a second signal; and a second switch configured to select whether to supply the driving current output from the output terminal of the conversion unit to the second light source by the second signal;

wherein the signal generation unit is configured to generate the second signal such that the second switch is kept selecting not to supply the driving current to the second light source even when the second voltage which is a continuous voltage is supplied, during a time period when the first voltage which is an intermittent voltage repeating a high-level time period and a low-level time period with a predetermined cycle is supplied.

2. A lighting circuit configured to supply a driving current to a first light source and a second light source configured to perform a function different from the first light source, the lighting circuit comprising:

a conversion unit configured to receive a first voltage for the first light source and a second voltage for the second light source via a common input terminal, to perform voltage conversion on the first voltage or the second voltage, and to supply the driving current from an output terminal;

a control unit configured to control a current value of the driving current output from the conversion unit;

a first switch configured to select whether to supply the driving current to the first light source by a first signal based on the first voltage;

a signal generation unit configured to receive the first voltage and the second voltage and to generate a second signal;

a second switch configured to select whether to supply the driving current to the second light source by the second signal; and a third switch configured to interrupt current flowing based on the second voltage to the input terminal of the conversion unit during a time period when the first voltage is supplied.

3. The lighting circuit according to claim 1, wherein the signal generation unit is configured to generate, as the second signal, a signal in which a predetermined delay time longer than the low-level time period of the first voltage is provided to a waveform of the second voltage.

4. The lighting circuit according to claim 1,
wherein the control unit is configured to control the conversion unit to output the driving current having a current value for the first light source at least during a time period when the first switch selects to supply the driving current to the first light source and to output the driving current having a current value for the second light source at least during a time period when the second switch selects to supply the driving current to the second light source.

5. The lighting circuit according to claim 1,
wherein the lighting circuit is used for a vehicle lamp device,
wherein a light emission surface of the first light source and a light emission surface of the second light source are closely arranged or are commonly used,
wherein the first light source serves as a turn signal lamp, and
wherein the second light source serves as a daytime running lamp.

6. A vehicle lamp device comprising:
a first light source;
a second light source;
a lighting circuit configured to supply a driving current to the first light source and the second light source, the lighting circuit including:
   a first input terminal configured to receive a first voltage for the first light source;
   a second input terminal configured to receive a second voltage for the second light source;
   a conversion unit including a common input terminal configured to receive the first voltage from the first input terminal and the second voltage from the second input terminal, and an output terminal, the conversion unit being configured to perform voltage conversion on the first voltage from the first input terminal or the second voltage from the second input terminal to supply the driving current from the output terminal;
   a control unit configured to control a current value of the driving current output from the output terminal of the conversion unit;
   a delay circuit that delays the second voltage based on the first voltage;
   a first switch configured to select whether to supply the driving current output from the output terminal of the conversion unit to the first light source by a first signal based on the first voltage;
   a signal generation unit configured to receive the first voltage and the second voltage and to generate a second signal; and
   a second switch configured to select whether to supply the driving current output from the output terminal of the conversion unit to the second light source by the second signal.

7. The lighting circuit according to claim 1,
wherein the first voltage is supplied from a battery voltage, and
wherein the second voltage is supplied from the battery voltage.

* * * * *